(12) United States Patent
Wirola et al.

(10) Patent No.: US 9,297,902 B2
(45) Date of Patent: Mar. 29, 2016

(54) ASSISTANCE DATA MANAGEMENT

(75) Inventors: Lauri Wirola, Tampere (FI); Ismo Halivaara, Tampere (FI)

(73) Assignee: Nokia Technolologies Oy, Espoo (FI)

( * ) Notice: Subject to any disclaimer, the term of this patent is extended or adjusted under 35 U.S.C. 154(b) by 962 days.

(21) Appl. No.: 13/514,803

(22) PCT Filed: Dec. 11, 2009

(86) PCT No.: PCT/EP2009/066921
§ 371 (c)(1),
(2), (4) Date: Sep. 13, 2012

(87) PCT Pub. No.: WO2011/069555
PCT Pub. Date: Jun. 16, 2011

(65) Prior Publication Data
US 2013/0005355 A1    Jan. 3, 2013

(51) Int. Cl.
*H04W 24/00* (2009.01)
*G01S 19/05* (2010.01)
*G01S 19/27* (2010.01)

(52) U.S. Cl.
CPC ........ *G01S 19/05* (2013.01); *G01S 19/27* (2013.01)

(58) Field of Classification Search
CPC ................................ G01S 19/05; G01S 19/27
USPC ....................................................... 455/456.1
See application file for complete search history.

(56) References Cited

U.S. PATENT DOCUMENTS

2005/0104772 A1*  5/2005  Diggelen et al. ......... 342/357.02
2005/0275587 A1* 12/2005  Siegel et al. ............. 342/357.06
2006/0114150 A1*  6/2006  van Diggelen et al. .. 342/357.02
2007/0082681 A1*  4/2007  Kim et al. ................. 455/456.1
2008/0125971 A1*  5/2008  van Diggelen et al. ...... 701/226

FOREIGN PATENT DOCUMENTS

CN            101533088 A        9/2009

OTHER PUBLICATIONS

Office Action for Chinese Application No. 200980162845.8; dated Oct. 17, 2013.
Office Action for Chinese Application No. 200980162845.8 dated Jan. 27, 2013.
Office Action for European Application No. EP 09 809 062 dated May 27, 2014.
Office Action for Chinese Application No. 200980162845.8 dated Aug. 11, 2014.
Office Action for Chinese Application No. 200980162845.8 dated Feb. 2, 2015.
Chinese Office Action for Application No. 200980162845.8, dated Jun. 24, 2013.
International Search Report/Written Opinion for Application No. PCT/EP2009/066921 dated Oct. 13, 2010.
International Search Report on Patentability for Application No. PCT/EP2009/066921 dated Mar. 15, 2012.

* cited by examiner

*Primary Examiner* — Shahriar Behnamian
(74) *Attorney, Agent, or Firm* — Alston & Bird LLP

(57) ABSTRACT

It is disclosed to keep a track of quality information of at least one assistance data, the track of quality information being associated with a current version and at least one previous version of the at least one assistance data, and to determine whether to provide assistance data information associated with at least one assistance data of the at least one assistance data to a mobile device based on tracked quality information of the at least one assistance data of the at least one assistance and based on assistance data handling parameters associated with the mobile device.

22 Claims, 6 Drawing Sheets

ASSISTANCE DATA MANAGEMENT

FIELD OF THE DISCLOSURE

This invention relates to the field of assistance data management.

BACKGROUND

Location services based on the location of mobile devices are becoming increasingly widespread. Assistance data for assisted navigation systems, such as global navigation satellite systems (GNSS), e.g. Global Positioning System (GPS), GLObal NAvigation Satellite System (GLONASS) and Galileo, have been specified and standardized for cellular systems. For instance, the delivery of such assistance data can be built on top of cellular system-specific control plane protocols including, e.g., the radio resource location services protocol (RRLP) for GSM networks, the radio resource control (RRC) layer of layer 3 in wideband code division multiple access (WCDMA) networks, IS-801 for CDMA networks and LTE Positioning Protocol LPP for E-UTRAN, standardized in 3GPP/3GPP2.

The Open Mobile Alliance (OMA) has defined a user plane protocol referred to as secure user plane location (SUPL). SUPL employs user plane data bearers for transferring location assistance information such as GNSS assistance data, as described above, for carrying positioning technology-related protocols between terminal, e.g., a mobile communication device and its operating network. SUPL is intended to be an alternative and, at the same time, a complement to the existing standards based on signaling in the mobile network control plane. SUPL assumes that a mobile or other network can establish a data bearer connection between a terminal and some type of location server. The use of a user plane protocol becomes especially appealing incase of IP networks where the data bearer is available by nature.

The assistance data delivery from the assistance data server to the terminal is normally initiated by an assistance data request originating from the terminal or positioning request originating from the server. As a response, the assistance data is delivered to the terminal. This is typical request-response type signaling which does not require any memory from the server as the request is served immediately.

Another way of delivering assistance data is to broadcast it. In this case, the same data is delivered to the group of terminals. For example, in a cellular network all terminals camped to one base station will receive the same information. This data can be, however, encrypted and decryption keys need to be requested separately to limit the user group. Still, when transmitting the assistance data, the server does not need to know which terminal belongs to the user group that receives the information or that can decrypt the information.

SUMMARY OF SOME EMBODIMENTS OF THE INVENTION

A first method is described, which comprises keeping a track of quality information of at least one assistance data, the track of quality information being associated with a current version and at least one previous version of the at least one assistance data, and determining whether to provide assistance data information associated with at least one assistance data of the at least one assistance data to a mobile device based on tracked quality information of the at least one assistance data of the at least one assistance and based on assistance data handling parameters associated with the mobile device.

Moreover, a first embodiment of a first apparatus is described, which comprises means for keeping a track of quality information of at least one assistance data, the track of quality information being associated with a current version and at least one previous version of the at least one assistance data, and means for determining whether to provide assistance data information associated with at least one assistance data of the at least one assistance data to a mobile device based on tracked quality information of the at least one assistance data of the at least one assistance and based on assistance data handling parameters associated with the mobile device.

The means of this apparatus can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit.

Moreover, a second embodiment of the first apparatus is described, which comprises at least one processor and at least one memory including computer program code, the at least one memory and the computer program code, with the at least one processor, configured to cause the apparatus at least to perform the actions of the presented first method.

Moreover, a computer readable storage medium is described, in which computer program code is stored. The computer program code causes an apparatus to realize the actions of the presented first method when executed by a processor.

The computer readable storage medium could be for example a disk or a memory or the like. As an example, the memory may represent a memory card such as SD and micro SD cards or any other well-suited memory cards or memory sticks. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

A second method is described, which comprises providing assistance data handling parameters to a server, the assistance data handling parameters being configured to be used at a server for determining whether to provide assistance data information associated with at least one assistance data based on a track of quality information of the at least one assistance data at the server, the track of quality information being associated with a current version and at least one previous version of the at least one assistance data.

Moreover, a first embodiment of a second apparatus is described, which comprises means for providing assistance data handling parameters to a server, the assistance data handling parameters being configured to be used at a server for determining whether to provide assistance data information associated with at least one assistance data based on a track of quality information of the at least one assistance data at the server, the track of quality information being associated with a current version and at least one previous version of the at least one assistance data.

The means of this second apparatus can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit.

Moreover, a second embodiment of the second apparatus is described, which comprises at least one processor and at least one memory including computer program code, the at least one memory and the computer program code, with the at least one processor, configured to cause the apparatus at least to perform the actions of the presented second method.

Moreover, a computer readable storage medium is described, in which computer program code is stored. The computer program code causes an apparatus to realize the actions of the presented second method when executed by a processor.

A third method is described, which comprises providing quality information of at least one assistance data to a server, the quality information being associated with a version of at least one assistance data.

Moreover, a first embodiment of a third apparatus is described, which comprises means for providing quality information of at least one assistance data to a server, the quality information being associated with a version of at least one assistance data.

The means of this third apparatus can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit.

Moreover, a second embodiment of the third apparatus is described, which comprises at least one processor and at least one memory including computer program code, the at least one memory and the computer program code, with the at least one processor, configured to cause the apparatus at least to perform the actions of the presented third method.

Moreover, a computer readable storage medium is described, in which computer program code is stored. The computer program code causes an apparatus to realize the actions of the presented second method when executed by a processor.

Moreover, a system is described, comprising an apparatus according the first, the second apparatus and the third apparatus.

For instance, the assistance data may represent positioning assistance data, e.g. for supporting for example a GNSS based positioning, but any other well-suited assistance data may be applied. As an example, the positioning assistance data may comprise, but is not limited to, navigation models, time assistance, reference location, atmosphere models, differential corrections, sensor assistance and acquisition assistance, position information, high-accuracy position information, multi-frequency multi-GNSS measurement data, sensor measurements, route information, waypoint information, fingerprint data and radiomap data. Fingerprint data may consist of records that are associated with position, wherein the record includes information on the radio characteristic at the given position. Such characteristics may, for example, include received signal strength. Radiomap data, on the other, may consists of the communication node coverage area models and/or node position information.

For instance, the quality information of the at least one assistance data may represent any kind of quality measure or quality representative indicating the quality of the current version of the at least one assistance data and/or the quality of at least one previous version of the at least one assistance data.

As an example, the quality information may comprise version information of the current version of at least one assistance data of the at least assistance data and version information of at least one previous version of at least one assistance data of the at least one assistance data.

Furthermore, for instance, the quality information may comprise validity information of the current version of at least one assistance data of the at least assistance data and validity information of at least one previous version of at least one assistance data of the at least one assistance data.

The validity information may represent any validity classification for the quality of a current version of at least one assistance data of the at least one assistance data and of at least one previous version of at least one assistance data of the at least one assistance data. For instance, a validity information for the quality of a respective version of at least one assistance data may be indicative of the accuracy performance expected for this respective version. As a non-limiting example, different classifications for the quality of one of the previous versions may include that data is invalid and must not be used in any circumstance,
data can be used, but the performance is poor, and
data can be used and the performance is good.

Furthermore, as an example, the validity information for the quality of a respective version of at least one assistance data may comprise a time certificate being indicative of the life-time of the respective version of the at least one assistance data.

For instance, different validity levels may used to define a set of possible validity classifications.

As an example, at least one assistance data of the at least one assistance data in the track of quality information may be associated with a predefined time interval. For instance, at least two assistance data may be associated with the same type of positioning assistance data, wherein each of the at least two assistance data may be associated with a different time interval. E.g., as a non-limiting example, such a time interval may represent a day, and a first assistance data of the at least two assistance data may be associated with day 0, and a second assistance data of the at least two assistance data may be associated with day 1, etc. For instance, assuming that that the at least two assistance data associated with the same type of positioning data comprise N assistance data being associated with N time intervals, wherein N≥2 holds, a time span comprising N consecutive predefined time intervals may be handled by means of these N assistance data for this type of positioning data. Thus, there may exist a plurality of these at least two assistance data, wherein each of the at least two assistance data of the plurality of these at least two assistance data is associated with a separate type of positioning assistance data.

Furthermore, as an example, the validity information for the quality of a respective version of the at least one assistance data may comprise, for at least one of the at least one assistance data associated with a predefined time interval, at least one time certificate being indicative of the life-time of the respective version of the at least one assistance data of the at least one assistance data associated with a predefined time interval.

For instance, a time interval associated with an assistance data may represent any well-suited time interval, e.g. based on seconds, minutes, hours, days, months, years and/or a combination thereof.

As a non-limiting example, the types of positioning assistance data may comprise navigation models, time assistance, reference location, atmosphere models, differential corrections, sensor assistance and acquisition assistance, position information, high-accuracy position information, multi-frequency multi-GNSS measurement data, sensor measurements, route information and waypoint information, but any other well-suited type of positioning assistance data may also be used. In addition, positioning assistance may comprise fingerprint data and radiomap data. Fingerprint data may consist of records that are associated with position, wherein the record includes information on the radio characteristic at the given position. Such characteristics may, for example, include received signal strength. Radiomap data, on the other, may consists of the communication node coverage area models and/or node position information.

For instance, the assistance data handling parameters associated with the mobile device, wherein the mobile device may represent one device of a plurality of mobile devices, may define the at least one assistance data of the at least one assistance data. Thus, this at least one assistance data of the at least one assistance data may define a set of at least one assistance data associated with the respective mobile device.

The assistance data handling parameters or at least a part of the assistance data handling parameters may be received at the first apparatus from the second apparatus, wherein the second apparatus may represent a mobile device or a mobile terminal.

For instance, the assistance data information may represent the at least one assistance data of the at least one assistance data. Accordingly, for example, the first apparatus may be configured to control, in which circumstances a current version of assistance data is provided to the second apparatus (e.g. mobile device) based on the track of quality information of the at least one assistance data.

Furthermore, as an example, the assistance data information may represent at least one indicator associated with at least one assistance data of the respective at least one assistance data, each of the at least one indicator indicating whether the respective assistance data in the mobile device is valid or not. Accordingly, the first apparatus may be configured to control, in which circumstances the second apparatus (e.g. mobile device) is notified about at least one new version of the at least one assistance data based on the track of quality information of the at least one assistance data.

The first apparatus is configured to keep a track of this quality information of at least one assistance data. For instance, the first apparatus may represent a server, e.g. an assistance data server.

According to a further aspect, the assistance data information comprises at least one of at least one assistance data of the respective at least one assistance data; quality information of at least one of the respective at least one assistance data; and at least one indicator associated with at least one assistance data of the respective at least one assistance data, each of the at least one indicator indicating whether the respective assistance data in the mobile device is valid or not.

For instance, each of the at least one assistance data of the respective at least one assistance data may represent the newest version of assistance data available to the first apparatus.

According to a further aspect, the assistance data handling parameters are indicative of the type of assistance data information of the respective at least one assistance data.

According to a further aspect, the first method comprises, in case it has been determined to provide assistance data information, providing the assistance data information to the second apparatus.

For instance, in case the quality information comprises at least one time certificate, as mentioned above, the assistance data information may comprise this at least one time certificate.

Accordingly, the second apparatus may handle the at least one assistance data based on the respective at least time certificate. For instance, the second apparatus may use the assistance data associated with one time certificate for the lifetime indicated by the time certificate until expiration, and when this assistance data become invalid due to expired lifetime, the second apparatus may request for an update of the respective assistance data at the first apparatus.

According to a further aspect, said track of quality information comprises at least one of: version information of the current version and the at least one previous version of the at least one assistance data; validity information of the current version, and the validity information of at least one previous version of the at least one assistance data.

For instance, the first apparatus may keep a track of the assistance data versions of the at least one assistance data and/or it may keep a track of the validity information of the current version, and/or it may keep track of the validity information of at least one previous version of the at least one assistance data.

According to a further aspect, said keeping track of quality information of the first method comprises, for at least one of the at least one assistance data, one of: accessing at least one updated quality information and updating the track of quality information by replacing at least one quality information of the track of quality information with at least one updated quality information of the at least one updated quality information; and accessing at least one quality information associated with a new version of the at least one assistance data and inserting this at least one quality information in the track of quality information.

Moreover, the third method and/or the third apparatus, which is configured to provide quality information of at least one assistance data the first apparatus, the quality information being associated with a version of at least one assistance data, may be configured to provide the respective version of the at least one assistance data to the first apparatus. Thus, the third apparatus may be configured to provide the at least one assistance data (associated with the respective version) together with the respective quality information to the first apparatus.

According to a further aspect, the third method comprises providing at least one updated quality information configured to be used to replace the corresponding at least one quality information at the server.

As an example, in case there is a new version of at least one of the at least assistance data available in the third apparatus, the third apparatus and/or the third method may provide the quality information of the new version of the respective at least one assistance data to the first apparatus. Furthermore, additionally, the third apparatus and/or third method may provide the new version of the respective at least one assistance data to the first apparatus, too.

Furthermore, for instance, the first apparatus may be configured to store at least the current version of the respective assistance data, wherein the third apparatus may be configured to provide the assistance data to the first apparatus. For instance, whenever there is a new version of an assistance data available at the third apparatus, the third apparatus may be configured to provide this new version of assistance data and the quality information of this new version to the first apparatus.

Furthermore, as an example, the third apparatus may be configured to provide at least one updated quality information configured to replace the corresponding at least one quality information at the first apparatus.

Thus, the first apparatus may be configured to access this updated quality information and to update the track of quality information by replacing the former quality information with the updated quality information.

Thus, a quality information associated with a version of the respective assistance data can be updated. For instance, the quality level associated with one of the previous versions of the respective assistance data may be decreased by means of this update, because there may exists a new current version of the respective assistance data.

Accordingly, the first apparatus may keep track of quality information of at least one assistance data provided by the third apparatus.

According to a further aspect, the method comprising accessing version information of each assistance data of the at least one assistance data of the at least one assistance data associated with the mobile device, wherein said determining whether to provide assistance data information is performed for each of the respective at least one assistance data based on a comparison of quality information associated with the respective version of the respective assistance data information of the mobile device with a predetermined quality threshold.

For instance, the version information of each assistance data of the at least one assistance data may be a part of the assistance data handling parameters, which may be provided by the third apparatus.

For instance, a quality information of an assistance data of the at least one assistance data may be determined, wherein this assistance data corresponds to the version of the assistance data actually stored in the mobile device. For instance, the assistance data handling parameters may comprise the version number and information indicative of the assistance data to be potentially updated. This assistance data handling parameters may be transmitted from the second apparatus to the first apparatus.

As another example, the first apparatus may store which version of at least one assistance data has been provided to the respective mobile device. In this exemplary case, it is not mandatory for the mobile device to transmit assistance data handling parameters comprising the version number and information indicative of the assistance data to be potentially updated.

Then, at the first apparatus, this determined quality information is compared with a predetermined quality threshold associated with the respective assistance data. For instance, the assistance data handling parameters associated with the respective mobile device may be indicative of the predetermined quality threshold for the respective assistance data.

In case the determined quality information is below the predetermined quality threshold, the first method may proceed with providing the assistance data information associated with the respective assistance data to the respective mobile device. Otherwise, in case the determined quality information is not below the predetermined quality threshold, no assistance data information associated with the respective assistance data may be provided to the respective mobile device.

For instance, this comparison may be performed for each of the at least one assistance data of the at least one assistance data in order to determine whether to provide assistance data information.

As an example, the predetermined quality threshold may be the actual version of the respective assistance data and the determined quality information may represent the version of the respective assistance data at the respective mobile device. Thus, in case there is a newer version available at the first apparatus, the predetermined quality information (i.e. the version of the respective assistance data at the respective mobile device) will be lower than the predetermined quality threshold (i.e. the actual version).

Furthermore, as another example, the predetermined quality threshold may be the first previous version of the respective assistance data. In this example, only every second new version of the respective assistance data may trigger providing the assistance information (in the newest version) of this respective assistance data to the mobile device.

For instance, as another example, the predetermined quality threshold may be a validity level associated with the respective assistance data and the determined quality information may represent the validity information of the version of the respective assistance data at the respective mobile device. As an example, there may exists a number of N different validity information levels defining a set of classifications, wherein each validity information associated with a version of the respective assistance data is one of the set of classifications. For instance, the lowest validity information level defines the worst quality, and increasing number of validity information level of the set of classifications defines an increased quality, such that the N-th validity information level of the set of classifications may define the best quality.

Thus, for instance, the determined quality information of the version of the respective assistance data at the mobile device may indicate the validity level of the respective assistance data at the mobile device, the validity level being one of the set of classifications.

According to a further aspect, the predetermined quality threshold represents a version information associated with the current version of the respective assistance data information; and a predetermined validity level associated with the respective assistance data information.

For instance, the version information associated with the current version information may represent the current version number, or it may represent the first previous version number, or it may represent the second previous version compared to the current version number or another version number.

According to a further aspect, the assistance data handling parameters are indicative of the predetermined quality threshold.

For instance, the assistance data handling parameters indicative of the predetermined quality threshold may be transmitted from the second apparatus to the first apparatus.

Thus, for instance, a mobile device may define the predetermined quality thresholds and communicate it to the server (first apparatus).

According to a further aspect of the first method, said determining whether to provide assistance data information is triggered by at least one trigger of: a request of the mobile device; a predefined time interval; when updated quality information is in the track of quality information; and when quality information associated with a new version of at least one assistance data is in the track.

As an example, the mobile device (second apparatus) may issue an assistance data request for updated data to the first apparatus. This may be achieved by transmitting assistance data handling parameters comprising a request for updated data acting as trigger in the first apparatus in order to determine whether to provide assistance data information to the mobile device. Thus, in response to the received assistance data handling parameters comprising the request for updated data of the mobile device, the first apparatus is configured to trigger the determining whether to provide assistance information and the first method may proceed according to one of the examples mentioned above.

Furthermore, for instance, in case of this assistance data request, the assistance data handling parameters may be indicative of version information of the at least one assistance data requested by means of the assistance data request.

Furthermore, the mobile device (second apparatus) may decide whether to obtain updated assistance data of at least one requested assistance data or an indicator associated with at least one of the at least one assistance data, each of the at least one indicator indicating whether the respective assistance data in the mobile device is valid or not.

For instance, the assistance data handling parameters may be indicative of the type of assistance data information of the respective at least one assistance data of the at least one assistance data, i.e. it may be indicative that the assistance data information potentially provided to the mobile device (second apparatus) comprises at least one of:

at least one assistance data of the respective at least one assistance data; and quality information of at least one of the respective at least one assistance data; and at least one indicator associated with at least one assistance data of the respective at least one assistance data, each of the at least one indicator indicating whether the respective assistance data in the mobile device is valid or not.

Furthermore, as an example, the mobile device (second apparatus) may subscribe for assistance data push by means of the assistance data handling parameters provided to the first apparatus. This may be achieved by transmitting assistance data handling parameters being indicative of at least one trigger of:

a predefined time interval; and when updated quality information is in the track of quality information; and when quality information associated with a new version of at least one assistance data is in the track; and another trigger.

For example, if the trigger is a predefined time interval, then anytime the predefined time elapses, the first method starts determining whether to provide assistance data.

For example, the trigger may be started when updated quality information is in the track of quality information. E.g., whenever updated quality information is provided by the third apparatus to the first apparatus, it may be determined at the first apparatus whether to provide assistance information associated with at least one assistance data (e.g. associated with the updated quality information) to the mobile device (second apparatus)

For instance, the trigger may be started when quality information associated with a new version of at least one assistance data is in the track. E.g., whenever a new version of assistance data and thus new quality information is provided by the third apparatus to the first apparatus, it may be determined at the first apparatus whether to provide assistance information associated with at least one assistance data (e.g. associated with the new quality information) to the mobile device (second apparatus).

Furthermore, for instance, any other trigger may be used. Moreover, for instance, several of the triggers may be combined.

As an example, when subscribing for assistance data push, the assistance data handling parameters may be indicative that the assistance data information comprises at least one assistance data (e.g. the newest version) of the respective at least one assistance data of the at least one assistance data to be potentially provided to the mobile device (second apparatus).

For instance, when subscribing for assistance data change information, the assistance data handling parameters may be indicative that the assistance data information comprises at least one indicator associated with at least one assistance data of the respective at least one assistance data, each of the at least one indicator indicating whether the respective assistance data in the mobile device is valid or not.

As an example, upon receiving the at least one indicator associated with at least one assistance data at the mobile device (second apparatus), the mobile device may decide whether to request the respective assistance data (e.g. in case it is indicated to be invalid) or to maintain the respective assistance data (e.g. in case is indicated to be valid).

Furthermore, the assistance data information may comprise quality information of at least one of the respective at least one assistance data. Thus, for example, this quality information may indicate that the version of the respective assistance data at the mobile device (second apparatus) will be invalid from some point in time onwards. For example, the newest assistance data is not provided to the terminal but this quality information is provided. For example, it might be known that a satellite will be manoeuvred 3 pm UTC onwards. Hence, when the mobile device checks for updates/data validity, it might be indicated that the assistance data the terminal has associated with this satellite will be invalid from 3 pm UTC onwards. For instance, this may be indicated by the above-mentioned time-certificate.

According to a further aspect, the assistance data handling parameters are indicative which at least one trigger is applied.

According to a further aspect, the first method comprising receiving at least a part of the data handling information from the mobile device.

Further aspects of the invention will be apparent from and elucidated with reference to the detailed description presented hereinafter.

DETAILED DESCRIPTION OF EXEMPLARY EMBODIMENTS OF THE INVENTION

In the following detailed description, non-limiting embodiments of the present invention will be described in the context of embodiments of methods and apparatuses.

Figure 1A:
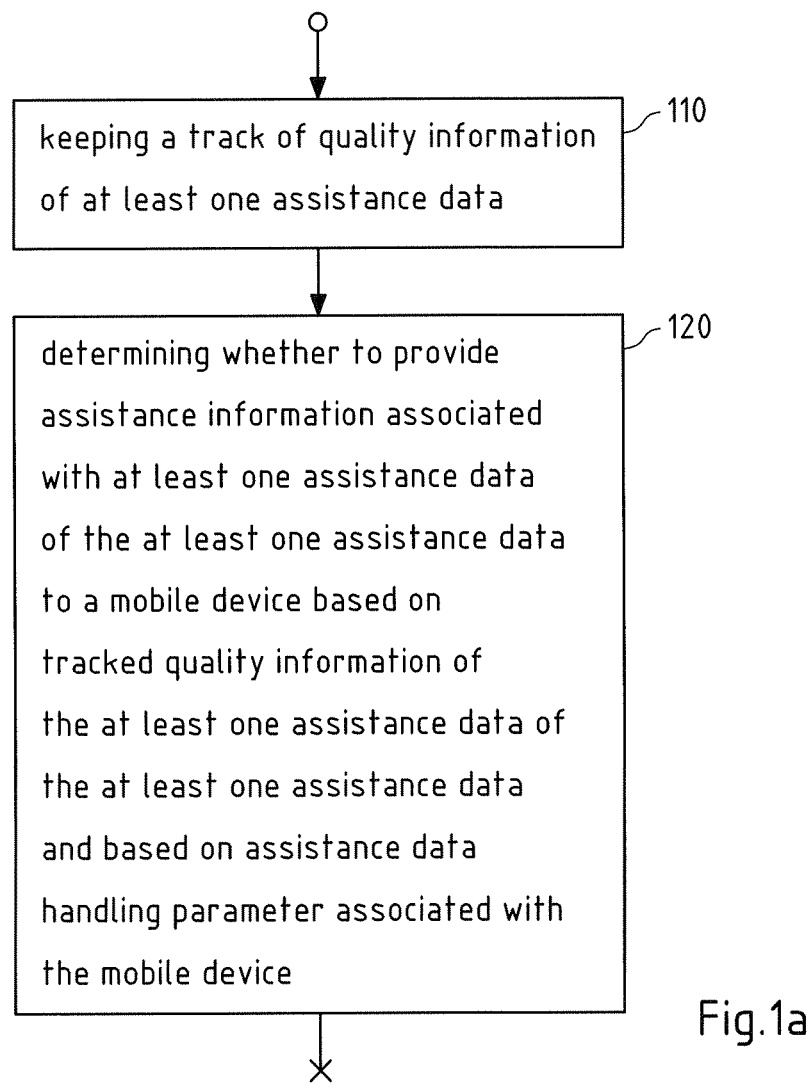
FIG. 1a is a flow chart illustrating a first embodiment of a first method.
Figure 1B:
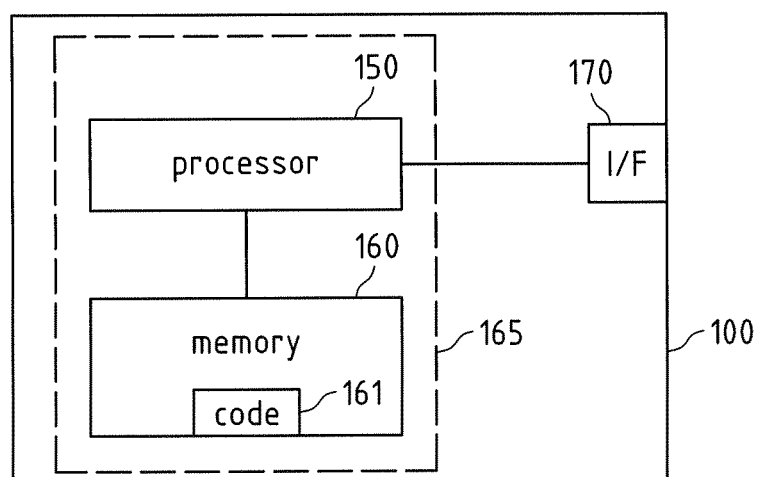
FIG. 1b is a schematic block diagram which illustrates a first embodiment of a first apparatus.

FIG. 1a is a flow chart illustrating a first embodiment of a method. This first embodiment of a first method will be described in conjunction with the first embodiment of a first apparatus 100 depicted in FIG. 1b.

For instance, the device 100 could be for example a network element of a network, like the internet or a wireless communication network, but equally a laptop, a desktop computer or a mobile phone, etc. It comprises a processor 150 and, linked to this processor 150, a memory 160 and an interface 170 enabling a link to other devices. The processor 150 and the memory 160 could optionally be integrated in a single component 165 illustrated in FIG. 1b by dashed lines, for example on a chip. For instance, the device 100 may represent a server.

The processor 150 is configured to execute implemented computer program code. The memory 160 stores computer program code that may be retrieved by the processor 150 for execution. The stored computer program comprise code 161 for keeping a track of quality information of at least one assistance data, the track of quality information being associated with a current version and at least one previous version of the at least one assistance data, and for determining whether to provide assistance data information associated with at least one assistance data of the at least one assistance data to a mobile device based on tracked quality information of the at least one assistance data of the at least one assistance and based on assistance data handling parameters associated with the mobile device. The memory 160 thus can be seen as an embodiment of a computer readable storage medium. Thus, the code 161 can be considered to implement the first embodiment of a method depicted in FIG. 1a.

The interface 170 may provide a direct link to at least one mobile device or an indirect link, for example via the internet and a wireless communication network. The interface 170 may support for example IP connections carrying location protocols, such as OMA SUPL.

For instance, the assistance data may represent positioning assistance data, e.g. for supporting for example a GNSS based positioning. The positioning assistance data may comprise, but is not limited to, navigation models, time assistance, reference location, atmosphere models, differential corrections, sensor assistance and acquisition assistance, position information, high-accuracy position information, multi-frequency multi-GNSS measurement data, sensor measurements, route information and waypoint information. In addition, positioning assistance may comprise fingerprint data and radiomap data. Fingerprint data may consist of records that are associated with position, wherein the record includes information on the radio characteristic at the given position. Such characteristics may, for example, include received signal strength. Radiomap data, on the other, may consists of the communication node coverage area models and/or node position information.

For instance, the quality information of the at least one assistance data may represent any kind of quality measure or quality representative indicating the quality of the current version of the at least one assistance data and the quality of at least one previous version of the at least one assistance data.

As an example, the quality information may comprise version information of the current version of at least one assistance data of the at least assistance data and version information of at least one previous version of at least one assistance data of the at least one assistance data.

Furthermore, for instance, the quality information may comprise validity information of the current version of at least one assistance data of the at least assistance data and validity information of at least one previous version of at least one assistance data of the at least one assistance data.

The validity information may represent any validity classification for the quality of a current version of at least one assistance data of the at least one assistance data and of at least one previous version of at least one assistance data of the at least one assistance data. For instance, a validity information for the quality of a respective version of at least one assistance data may be indicative of the accuracy performance expected for this respective version. As a non-limiting example, different classifications for the quality of one of the previous versions may include that data is invalid and must not be used in any circumstance,
data can be used, but the performance is poor, and
data can be used and the performance is good.

For instance, different validity levels may used to define a set of possible validity classifications.

The first apparatus 100 is configured to keep a track of this quality information of at least one assistance data, as indicated by reference sign 110 in FIG. 1a.

For instance, the assistance data handling parameters associated with the mobile device, wherein the mobile device may represent one device of a plurality of mobile devices, may define the at least one assistance data of the at least one assistance data. Thus, this at least one assistance data of the at least one assistance data may define a set of at least one assistance data associated with the respective mobile device.

Figure 2A:
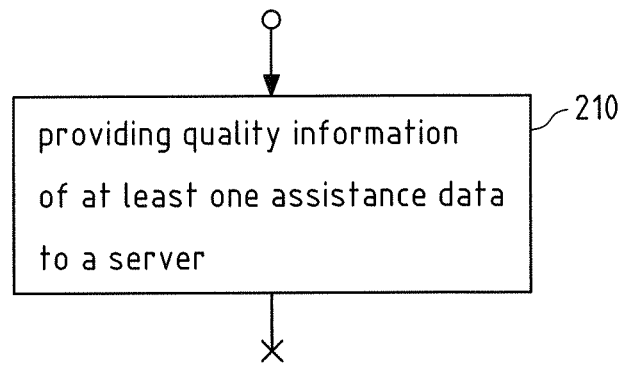
FIG. 2a is a flow chart illustrating a first embodiment of a third method.
Figure 2B:
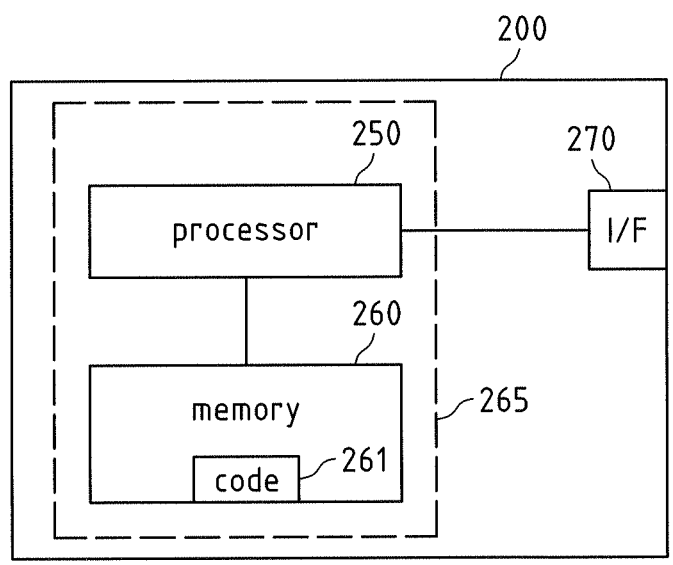
FIG. 2b is a schematic block diagram which illustrates a first embodiment of a third apparatus.

FIG. 2b illustrates a first embodiment of a third apparatus 200 which will be explained in conjunction with a first embodiment of a third method depicted in FIG. 2a.

For instance, the apparatus 200 could be for example a network element of a network, like the internet or a wireless communication network, but equally a laptop, a desktop computer or a mobile phone, etc. It comprises a processor 250 and, linked to this processor 250, a memory 260 and an interface 270 enabling a link to other devices. The processor 250 and the memory 260 could optionally be integrated in a single component 265 illustrated in FIG. 2b by dashed lines, for example on a chip.

The processor 250 is configured to execute implemented computer program code. The memory 260 stores computer program code that may be retrieved by the processor 250 for execution. The stored computer program comprise code 261 for providing at least one assistance data to a server, e.g. to the first apparatus 100. The memory 260 thus can be seen as an embodiment of a computer readable storage medium. Thus, the code 261 can be considered to implement the first embodiment of the third method depicted in FIG. 1a.

For instance, the third apparatus 200 may represent an entity of a data provider configured to provide at least one assistance data to a server, e.g. to the first apparatus 100. The first embodiment of the third method comprises providing 210 quality information of at least one assistance data to a server 100.

As an example, in case there is a new version of at least one of the at least assistance data available in the third apparatus 200, the third apparatus 200 may provide the quality information of the new version of the respective at least one assistance data to the first apparatus 100. Furthermore, additionally, the third apparatus 200 may provide the new version of the respective at least one assistance data to the first apparatus 100, too.

Figure 3A:
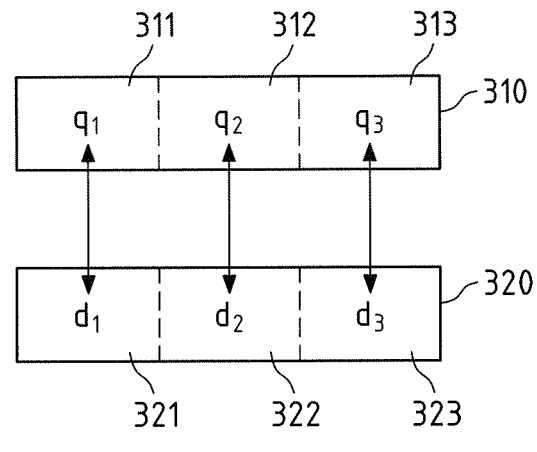
FIG. 3a is a first example of a track of quality information.

As an example, FIG. 3a depicts an example of a track of quality information $q_1$, $q_2$ and $q_3$ for one assistance data d of the at least one assistance data, the track indicated by reference sign 310, wherein quality information $q_3$ is associated with the actual version of assistance data $d_3$, and $q_2$ is associated with the actual first previous assistance data $d_2$, and $q_1$ is associated with the actual second previous assistance data $d_1$. The different versions of assistance data $d_1$, $d_2$, $d_3$ all correspond to one assistance data d of the at least one assistance data. It has to be understood, that the track of quality information kept in first apparatus 100 may be performed for more than one assistance data, but in the sequel it will be explained, without loss of generality, with respect to one assistance data.

Figure 3B:
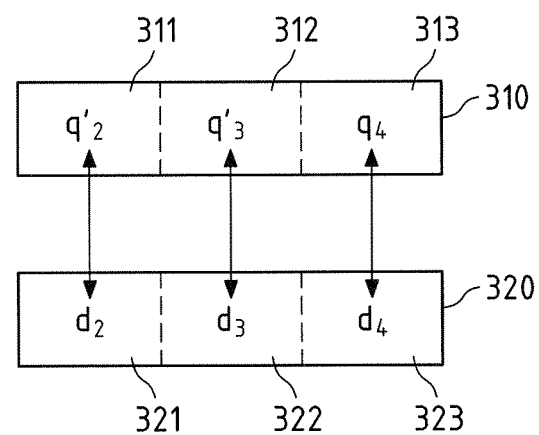
FIG. 3b is a second example of a track of quality information.

For instance, the third apparatus 200 may provide new quality information $q_4$ associated with a new version $d_4$ of the respective assistance data. The first apparatus 100 is configured to access this quality information $q_4$ associated with the new version $d_4$ of the assistance data d of the at least one assistance data and inserts this quality information $q_4$ in the track 310, as indicated in FIG. 3b. For example, the track 310 may be configured to handle one quality information 313 associated with a current version 323 of the respective assistance data 320 and at least one quality information associated with at least one previous version 322, 321 of respective assistance data d 320. In this non-limiting example, the track 310 is configured to handle three quality information 311, 312, 313, wherein a first quality information 313 of the three quality information is associated with the current version 323 of the respective assistance data d, and wherein a second quality information 312 is associated with the first previous versions 322 of the respective assistance data d and wherein a second quality information 311 is associated with the second previous version 321 of the respective assistance data d. Thus, as an example, the track 310 of quality information may be configured to handle M quality information, wherein this set of M quality information is associated with the current version and with the M−1 previous versions of the respective assistance data d.

Furthermore, for instance, the first apparatus 100 may be configured to store at least the current version 323 of the respective assistance data, wherein the third apparatus 200 may be configured to provide the assistance data to the first apparatus 100. For instance, whenever there is a new version of an assistance data available at the third apparatus 200, the third apparatus may be configured to provide this new version of assistance data and the quality information of this new version to the first apparatus 100. As an example, the quality information of this new version may indicate that the corresponding new version of assistance data is of "excellent quality".

Furthermore, as an example, the third apparatus 200 may be configured to provide at least one updated quality information configured to replace the corresponding at least one quality information at the first apparatus 100. For instance, with respect to the example depicted in FIG. 3b, in case the third apparatus 200 provides quality information $q_4$ associated with a new version $d_4$ of the respective assistance data, the third apparatus 200 may be configured to provide at least one update, e.g. $q_2'$ and $q_3'$, for quality information $q_2$ and $q_3$.

Thus, the first apparatus 100 may be configured to access this updated quality information $q_2'$ and $q_3'$ and to update the track 310 of quality information by replacing the former quality information $q_2$ and $q_3$ with the updated quality information $q_2'$ and $q_3'$, as depicted in FIG. 3b.

Thus, a quality information associated with a version of the respective assistance data can be updated. For instance, the quality level associated with one of the previous versions of the respective assistance data may be decreased by means of this update, because there may exists a new current version of the respective assistance data.

Figure 3C:
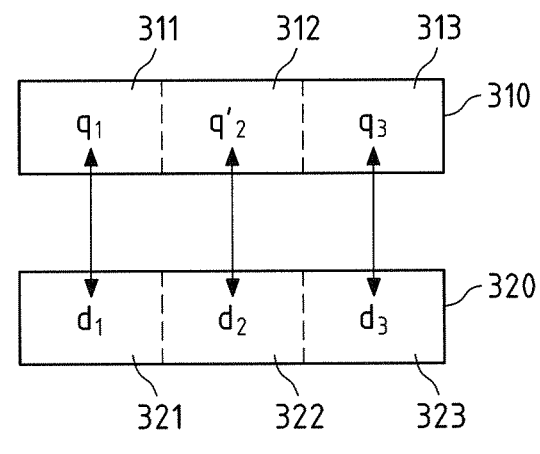
FIG. 3c is a third example of a track of quality information.

As another example, at least one quality data may be updated in the track of quality information 310 by inserting a new quality information, as depicted in FIG. 3c. For instance, the first apparatus 100 may be configured to access at least one updated quality information $q_2'$ and to update the track 310 of quality information by replacing the former quality information $q_2$ with the updated quality information $q_2'$, as depicted in FIG. 3c. For instance, the third apparatus 200 may provide this at least one updated quality information in case there is a new or corrected quality information of the same version $d_2$ of the respective assistance data, wherein this version $d_2$ of respective assistance data may already have been transmitted to the first apparatus 100, so that only the corresponding quality information $q_2$ has to be updated.

Accordingly, the first apparatus 100 may keep track of quality information of at least one assistance data provided by the third apparatus 200.

Furthermore, the first apparatus 100 is configured to determine whether to provide assistance data information associated with at least one assistance data of the at least one assistance data to a mobile device based on tracked quality information of the at least one assistance data of the at least one assistance and based on assistance data handling parameters associated with the mobile device, as indicated by reference sign 120 in FIG. 1a.

For instance, the assistance data information may represent the at least one assistance data of the at least one assistance data. Accordingly, for example, the apparatus 100 may be configured to control, in which circumstances a current version 323 of assistance data is provided to the mobile device based on the track of quality information of the at least one assistance data.

Furthermore, as an example, the assistance data information may represent at least one indicator associated with at least one assistance data of the respective at least one assistance data, each of the at least one indicator indicating whether the respective assistance data in the mobile device is valid or not. Accordingly, the apparatus may 100 may be configured to control, in which circumstances the mobile device is notified about at least one new version of the at least one assistance data based on the track of quality information of the at least one assistance data.

For instance, the assistance data handling parameters may be indicative of the type of assistance data information of the respective at least one assistance data. E.g. the assistance data handling parameters may indicate whether the assistance information comprises at least one of:

at least one assistance data of the respective at least one assistance data; and
  quality information of at least one of the respective at least one assistance data; and
  at least one indicator associated with at least one assistance data of the respective at least one assistance data, each of the at least one indicator indicating whether the respective assistance data in the mobile device is valid or not.

Each of the at least one assistance data of the respective at least one assistance data may represent the newest version of assistance data available to the first apparatus.

For example, apparatus 100 may be configured to determine whether the quality of an assistance data at the mobile device provides sufficient quality, e.g. by determining the quality information of this assistance data, i.e. the version of this assistance data stored in mobile device, based on the track of quality information.

Since the assistance data handling parameters are associated with the respective mobile device, different kind of settings for different mobile devices may be applied for determining whether to provide assistance data information to the respective mobile device.

Figure 4:
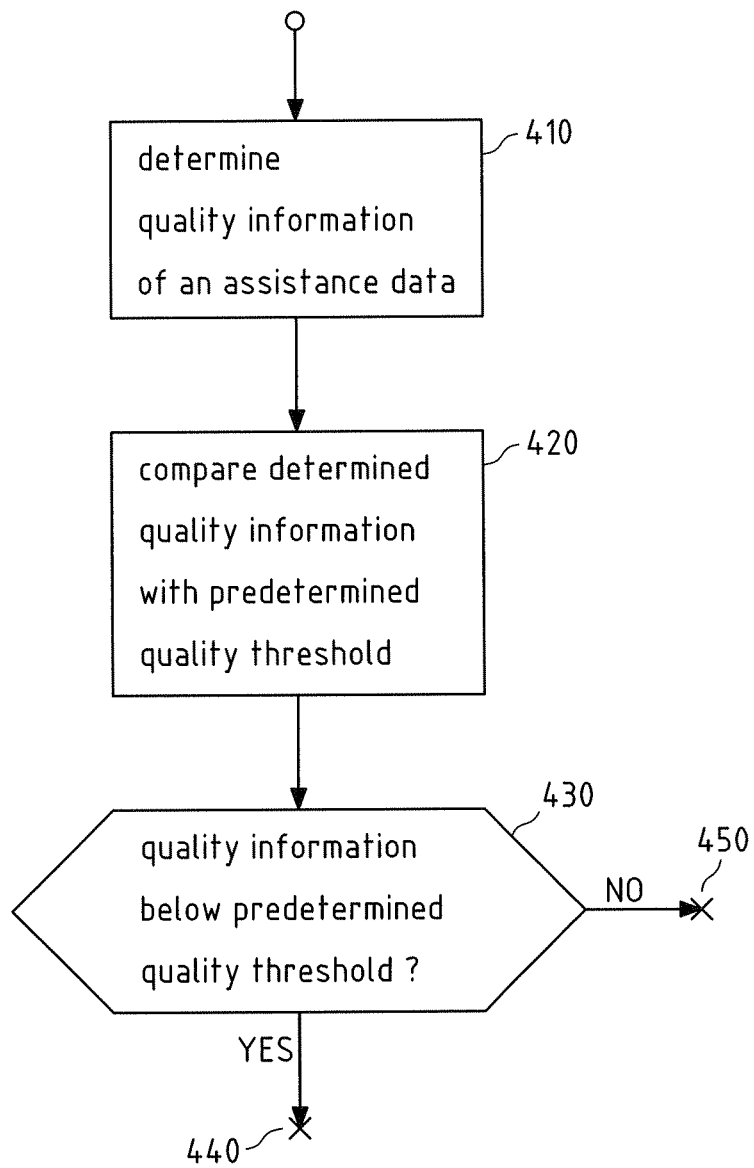
FIG. 4 is a flow chart illustrating a second embodiment of the first method.

FIG. 4 is a flow chart illustrating a second embodiment of the first method, which may be used for determining 110 whether to provide assistance information depicted in FIG. 1a.

First, a quality information of an assistance data of the at least one assistance data is determined, as indicated by reference sign 410, wherein this assistance data corresponds to the version of the assistance data actually stored in the mobile device. For instance, the assistance data handling parameters may comprise the version number and information indicative of the assistance data to be potentially updated. This assistance data handling parameters may be transmitted from a mobile device 600 to the first apparatus 100. For instance, the first embodiment of a mobile device 600 depicted in FIG. 6a may be used to transmit this assistance data handling parameters to the first apparatus 100. As another example, the first apparatus 100 may store which version of each assistance data has been provided to the respective mobile device. In this exemplary case, it is not mandatory for the mobile device to transmit assistance data handling parameters comprising the version number and information indicative of the assistance data to be potentially updated.

Then, this determined quality information is compared with a predetermined quality threshold associated with the respective assistance data, as indicated by reference sign 420. For instance, the assistance data handling parameters associated with the respective mobile device may be indicative of the predetermined quality threshold for the respective assistance data.

In case (see reference sign 430) the determined quality information is below the predetermined quality threshold, as indicated by reference sign 440, the method may proceed with providing the assistance data information associated with the respective assistance data to the respective mobile device. Otherwise, in case the determined quality information is not below the predetermined quality threshold, as indicated by reference sign 450, no assistance data information associated with the respective assistance data is provided to the respective mobile device.

The second embodiment of a method depicted in FIG. 4 may be performed for each of the at least assistance data of the at least one assistance data in order to determine whether to provide assistance data information.

As an example, the predetermined quality threshold may be the actual version of the respective assistance data and the determined quality information may represent the version of the respective assistance data at the respective mobile device. Thus, in case there is a newer version available at the first apparatus 100, the predetermined quality information (i.e. the version of the respective assistance data at the respective mobile device) will be lower than the predetermined quality threshold (i.e. the actual version). Furthermore, as an example, the predetermined quality threshold may be the first previous version of the respective assistance data. In this example, only every second new version of the respective assistance data may trigger to provide the assistance information of this respective assistance data to the mobile device.

For instance, as another example, the predetermined quality threshold may be a validity level associated with the respective assistance data and the determined quality information may represent the validity information of the version of the respective assistance data at the respective mobile device. For instance, with respect to the example depicted in FIG. 3a, the version of the respective assistance data at the mobile device 600 may be version number 2, i.e. $d_2$. E.g., this may be indicated by the assistance data handling parameter transmitted from the mobile device 600. Then, apparatus 100 determines the first previous quality information $q_2$ to be associated with the version of the assistance data at the mobile device and the first previous quality information $q_2$ may comprise the validity information of the version of the respective assistance data at the respective mobile device.

As an example, there may exists a number of N different validity information levels defining a set of classifications, wherein each validity information associated with a version of the respective assistance data is one of the set of classifications. For instance, the lowest validity information level defines the worst quality, and increasing number of validity information level of the set of classifications defines an increased quality, such that the N-th validity information level of the set of classifications may define the best quality. For instance, the example mentioned above comprises three different validity information levels, e.g. level 1 may indicate that data is invalid and must not be used in any circumstance, level 2 may indicate that data can be used, but the performance is poor, and level 3 may indicate that data can be used and the performance is good.

Thus, in this example, the determined quality information of the version of the respective assistance data at the mobile device indicates the validity level of the respective assistance data at the mobile device, the validity level being one of the set of classifications.

With respect to the non-limiting example with N=3 different validity levels, for instance, the predetermined quality threshold may be chosen to be level 2 for the respective assistance data, e.g. indicated by the assistance data handling parameters of the respective mobile device. In this case, it is only determined to provide assistance data information associated with the respective assistance data to the respective mobile device in case the validity information of the version of the respective assistance data stored at the mobile device represent level 1 in the track of quality information 310 kept at apparatus 100. For instance, with respect to FIG. 3a, it may be assumed that version 2 of assistance data ($d_2$) is stored at the mobile device 600, i.e. $q_2$ represents the quality information associated with the version of the assistance data at the mobile device, and wherein this quality information comprises validity information having a validity level 2. Then, under the assumption that the predetermined threshold level for this assistance data is set to level 2, it is determined at step 430 that the quality information is not below the predetermined quality threshold and it is not determined to provide assistance data information associated with this respective assistance data to the mobile device.

Furthermore, switching to FIG. 3b illustrating the exemplary track 310 of quality information, for instance, it may be assumed that the quality information associated with the version 2 of the assistance data has been updated to level 1, i.e. indicating that version 2 of the assistance data is invalid now.

Accordingly, in step 430, it is determined that the determined quality information, represented by level 1, is below the predetermined quality threshold, i.e. level 2. Thus, the method proceeds at reference sign 440 and may trigger providing the assistance data information to the respective mobile device.

As an example, the quality information may be decided by a service provider.

For instance, in case one assistance data of the at least one assistance data represents a ionosphere model, it might be defined that if the use of a certain version of the model results in positioning error >100 m, i.e. the version of the model invalid, e.g. indicated by validity level 1;

100-30 m, i.e. the version of the model is "poor", e.g. indicated by validity level 2;

30-0 m, i.e. the version of the model is "good", e.g. indicated by validity level 3.

For instance, an update of assistance data or indication capabilities may be required in case the assistance data contains information with unpredictable life time and/or unpredictable update rate. For instance, one assistance data of the at least one assistance data may represent a long-term satellite vehicle (SV) navigation model that may become invalid due to the SV being manoeuvred to higher altitude. For instance, if the satellite orbit is predicted 14 days in advance, the first prediction for the day 14 made on day 1 may be of low accuracy. However, as, say, 7 days go by, the accuracy of the prediction for the day 14 will probably have improved. It may still, however, be the case that the first prediction is of sufficient quality to be used, although an improved prediction is also available. Thus, by choosing an appropriate predetermined quality threshold bandwidth consumption may be reduced.

Another example is atmosphere models that may change abruptly due to, say, ionosphere storm. In the storm conditions, in addition to the model parameters changing abruptly, also the update rate is likely to be higher than in the normal quiet conditions. Again, even in such a case the predictions made earlier may be of sufficient accuracy, but likewise the models may also provide completely incorrect data. For instance, wrong sign of correction making performance (accuracy) actually worse.

As another example, the mobile device 600 may indicate that it always wants to receive assistance data information if the device 600 does not have "good" version of assistance data. In this case, for example, the mobile device 600 may provide assistance data handling parameters to the first apparatus 100 indicating that the predetermined quality threshold is set to level 3 (under assumption of the above given example).

Accordingly, for instance, the first apparatus 100 is configured to determine, based on the tracked quality information and the assistance data handling parameters, whether the mobile device 600 has a version of a respective assistance data providing sufficient quality with respect to the predefined quality threshold associated with the respective assistance data or not.

Figure 6A:
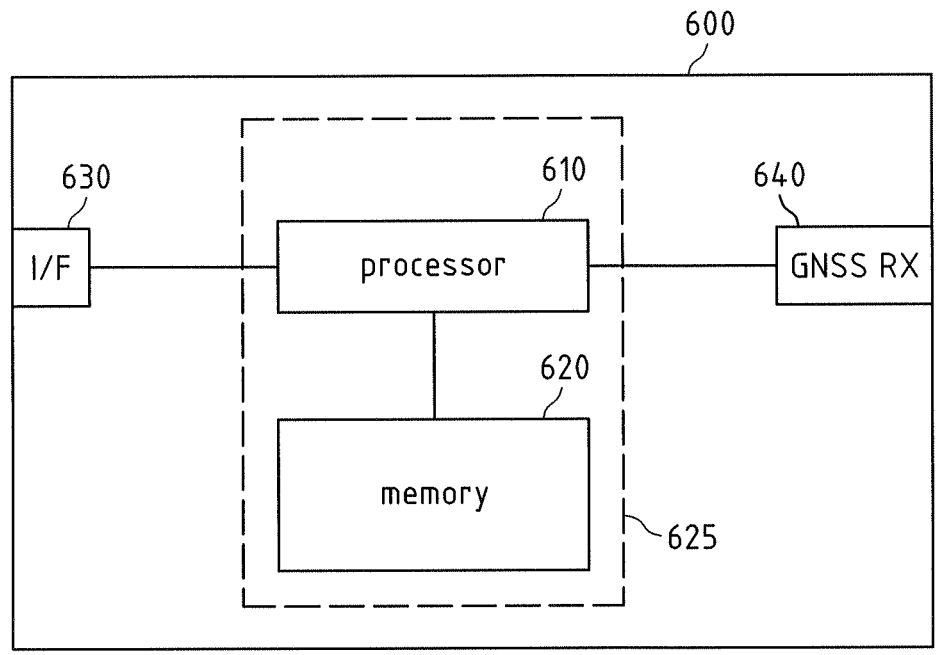
FIG. 6a is a schematic block diagram which illustrates a first embodiment of a second apparatus.

FIG. 6*a* is first embodiment of a second apparatus 600 representing a mobile device 600 or a mobile terminal 600. The second apparatus 600 comprises a processor 610 and, linked to this processor 610, a memory 620 and an interface 630 enabling a link to other devices/apparatuses. The processor 610 and the memory 620 could optionally be integrated in a single component 625 illustrated in FIG. 6*a* by dashed lines, for example on a chip. For instance, the device 100 may represent a server.

The processor 610 is configured to execute implemented computer program code. The memory 620 stores computer program code that may be retrieved by the processor 610 for execution. The stored computer program comprise code to provide assistance data handling parameters configured to be used at the first apparatus 100 for determining whether to provide assistance data information based on a track of quality information of the at least one assistance data at the server, the track of quality information being associated with a current version and at least one previous version of the at least one assistance data.

The interface 630 may provide a direct link to the first apparatus 100 or an indirect link, for example via the internet and a wireless communication network. The interface 630 may support for example IP connections carrying location protocols, such as OMA SUPL. The interface 630 could for example be a transceiver belonging to a cellular engine of the second apparatus 600 and support an access to a cellular communication network, or it could belong to a WLAN engine of the second apparatus 600 and support an access to a WLAN. Alternatively, the interface 630 could support wireless links using any other kind of technology.

Figure 6B:
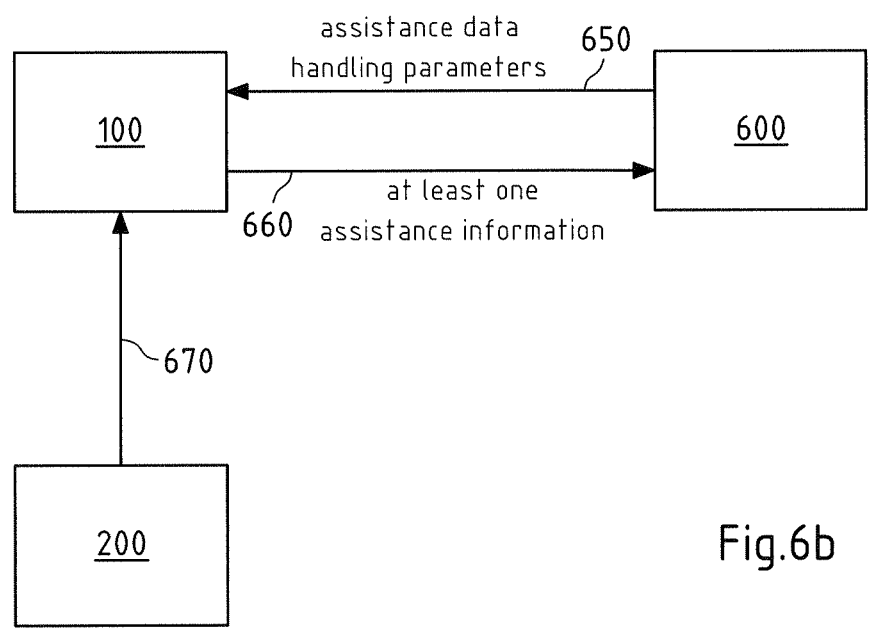
FIG. 6b a schematic block diagram which illustrates an embodiment of a system.

Thus, the second apparatus 600 is configured to transmit assistance data handling parameters 650 to the first apparatus, as depicted in the exemplary embodiment of a system in FIG. 6*b*.

For instance, a GNSS receiver 640 may be integrated in the second apparatus 600. Alternatively, as an example, it could be or belong to an accessory device that is connected to the second apparatus. Thus, the second apparatus 600 may be configured to receive, acquire, track and decode signals transmitted by satellites belonging to one or more GNSSs, such as GPS and Galileo. For instance, based on the navigation information in the decoded signals and on measurements on the received signals, it may further be able to compute its position and velocity, etc. The assistance data may comprise possible positioning assistance data for supporting for example a GNSS based positioning.

Figure 5:
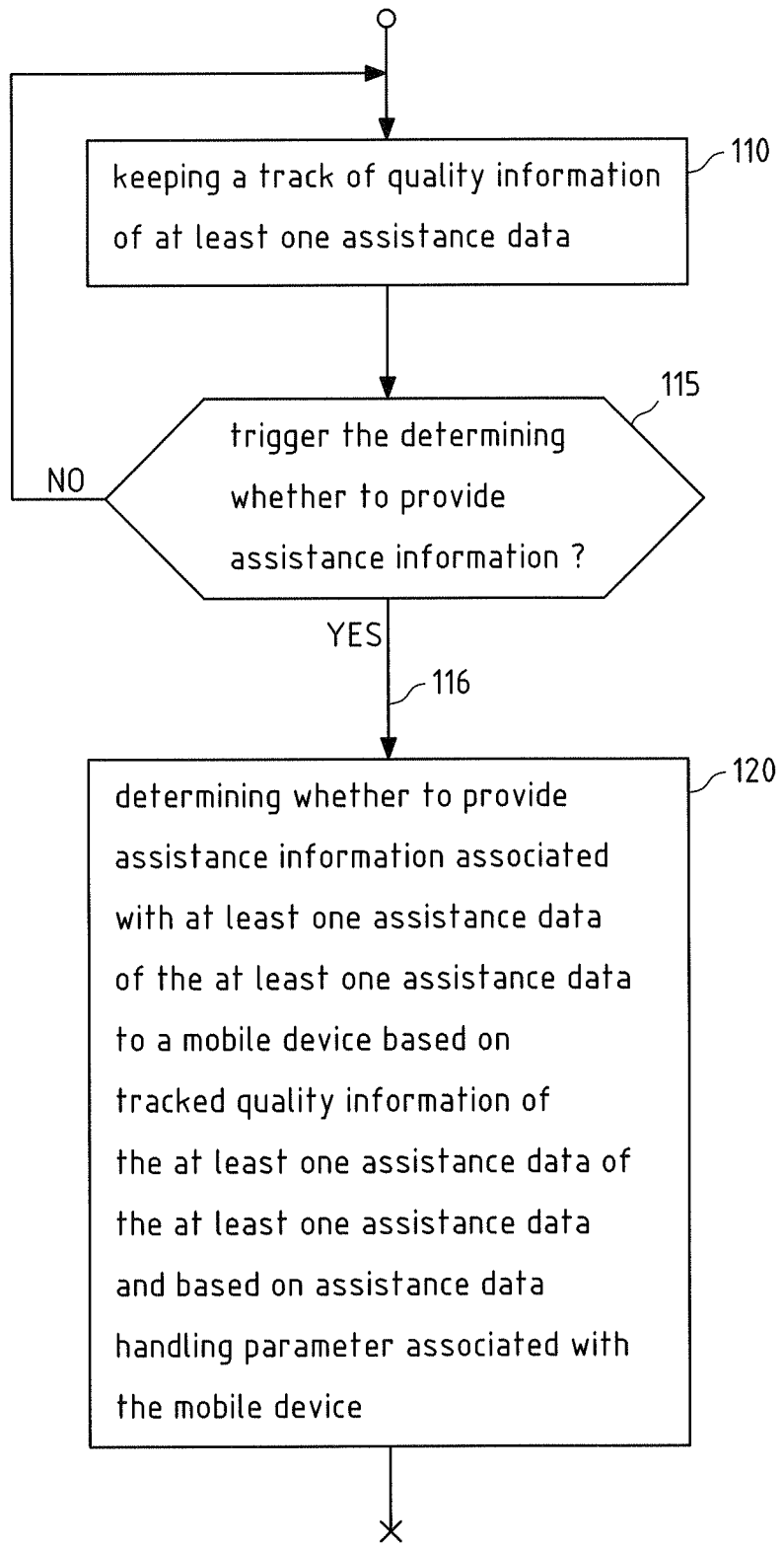
FIG. 5 is a flow chart illustrating a third embodiment of the first method.

FIG. 5 is a flow chart illustrating a third embodiment of a method which is based on the first embodiment of a method depicted in FIG. 1*a*.

In addition to the first embodiment of a method depicted in FIG. 1*a*, the third embodiment of a method comprises deciding 115 whether to trigger the determination whether to provide assistance data. If there is no trigger the method repeats with keeping the track of quality information 110, otherwise, if there is a trigger, the method proceeds with determining whether to provide assistance information, as indicated by reference sign 120 in FIG. 5*a*.

For instance, the trigger is at least one trigger of:
a request of the mobile device;
a predefined time interval; and
when updated quality information is in the track of quality information; and
when quality information associated with a new version of at least one assistance data is in the track.

As an example, the mobile device 600 may issue an assistance data request for updated data to the first apparatus 100. This may be achieved by transmitting assistance data handling parameters 650 comprising a request for updated data acting as trigger in the first apparatus 100 in order to determine whether to provide assistance data information to the mobile device. Thus, in response to the received assistance data handling parameters comprising the request for updated data of the mobile device, it is decided at step 115 to trigger the determination whether to provide assistance information and the method may proceed according to one of the examples mentioned above. Furthermore, for instance, in case of this assistance data request, the assistance data handling parameters 650 may be indicative of version information of the at least one assistance data requested by means of the assistance data request.

Furthermore, the mobile device 600 may decide whether to obtain updated assistance data of at least one requested assistance data or an indicator associated with at least one of the at least one assistance data, each of the at least one indicator indicating whether the respective assistance data in the mobile device 600 is valid or not.

The assistance data handling parameters 650 may be indicative of the type of assistance data information of the respective at least one assistance data of the at least one assistance data, i.e. it may be indicative that the assistance data information 660 potentially provided to the mobile device 600 comprises at least one of:

- at least one assistance data of the respective at least one assistance data; and
- quality information of at least one of the respective at least one assistance data; and
- at least one indicator associated with at least one assistance data of the respective at least one assistance data, each of the at least one indicator indicating whether the respective assistance data in the mobile device is valid or not.

Furthermore, the mobile device 600 may subscribe for assistance data push by means of the assistance data handling parameters 650 provided to the first apparatus 100. This may be achieved by transmitting assistance data handling parameters being indicative of at least one trigger of:

- a predefined time interval; and
- when updated quality information is in the track of quality information; and
- when quality information associated with a new version of at least one assistance data is in the track; and
- another trigger.

For example, if the trigger is a predefined time interval, then the method depicted in FIG. 5 jumps to step 120 when the predefined time elapses.

For example, the trigger 116 may be started when updated quality information is in the track of quality information. E.g., whenever updated quality information 670 is provided by the third apparatus 200 to the first apparatus 100, it may be determined at the first apparatus 100 whether to provide assistance information 660 associated with at least one assistance data (e.g. associated with the updated quality information) to the mobile device 600.

For instance, the trigger 116 may be started when quality information associated with a new version of at least one assistance data is in the track. E.g., whenever a new version of assistance data and thus new quality information 670 is provided by the third apparatus 200 to the first apparatus 100, it may be determined at the first apparatus 100 whether to provide assistance information 660 associated with at least one assistance data (e.g. associated with the new quality information) to the mobile device 600.

Furthermore, for instance, any other trigger may be used. Moreover, for instance, several of the triggers may be combined.

As an example, when subscribing for assistance data push, the assistance data handling parameters 650 may be indicative that the assistance data information comprises at least one assistance data (e.g. the newest version) of the respective at least one assistance data of the at least one assistance data to be potentially provided to the mobile device 600.

For instance, when subscribing for assistance data change information, the assistance data handling parameters 650 may be indicative that the assistance data information comprises at least one indicator associated with at least one assistance data of the respective at least one assistance data, each of the at least one indicator indicating whether the respective assistance data in the mobile device is valid or not.

As an example, upon receiving the at least one indicator associated with at least one assistance data, the mobile device 600 may decide whether to request the respective assistance data (e.g. in case it is indicated to be invalid) or to maintain the respective assistance data (e.g. in case it is indicated to be valid).

Furthermore, the assistance data information may comprise quality information of at least one of the respective at least one assistance data. Thus, for example, this quality information may indicate that the version of the respective assistance data at the mobile device 600 will be invalid from some point in time onwards. For example, the newest assistance data is not provided to the terminal but this quality information is provided. For example, it might be known that a satellite will be manoeuvred 3 pm UTC onwards. Hence, when the mobile device may check for updates/data validity, it might be indicated that the assistance data the terminal has associated with this satellite will be invalid from 3 pm UTC onwards.

Furthermore, it is readily clear for a person skilled in the art that the logical blocks in the schematic block diagrams as well as the flowchart and algorithm steps presented in the above description may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

Any presented connection in the described embodiments is to be understood in a way that the involved components are operationally coupled. Thus, the connections can be direct or indirect with any number or combination of intervening elements, and there may be merely a functional relationship between the components.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, that features of these embodiments may be omitted or replaced and that other features may be added. Any mentioned element and any mentioned method step can be used in any combination with all other mentioned elements and all other mentioned method step, respectively. It is the intention, therefore, to be limited only as indicated by the scope of the claims appended hereto.

The invention claimed is:

1. A method, comprising:
    keeping a track of quality information of at least one assistance data on a server, the track of quality information being associated with a current version and at least one previous version of the at least one assistance data; wherein said track of quality information comprises quality information associated with the current version of a respective assistance data and at least one quality information associated with at least one previous version of the respective assistance data; and
    determining on the server whether to provide assistance data information associated with at least one assistance data to a mobile device based on tracked quality information of the at least one assistance data and based on assistance data handling parameters associated with the mobile device.

2. The method of claim 1, wherein the assistance data information comprises at least one of:
    at least one assistance data; and
    quality information of at least one of the at least one assistance data; and
    at least one indicator associated with at least one assistance data, each of the at least one indicator indicating whether the respective assistance data in the mobile device is valid or not.

3. The method of claim 1, wherein said track of quality information comprises at least one of:
    version information of the current version and the at least one previous version of the at least one assistance data;
    validity information of the current version; and
    validity information of the at least one previous version of the at least one assistance data.

4. The method of claim 1, the method comprising accessing version information of each assistance data associated with the mobile device, wherein said determination whether to provide assistance data information is performed for each of the respective at least one assistance data based on a comparison of quality information associated with the respective version of the respective assistance data information of the mobile device with a predetermined quality threshold.

5. The method of claim 1, wherein said determination whether to provide assistance data information is triggered by at least one trigger of:
    a request of the mobile device;
    a predefined time interval; and
    when updated quality information is in the track of quality information; and
    when quality information associated with a new version of at least one assistance data is in the track of quality information.

6. The method of claim 1, wherein said keeping track of quality information comprises, for at least one of the at least one assistance data, one of:
    accessing at least one updated quality information and updating the track of quality information by replacing at least one quality information of the track of quality information with at least one updated quality information; and
    accessing at least one quality information associated with a new version of the at least one assistance data and inserting this at least one quality information in the track of quality information.

7. A method, comprising:
    providing assistance data handling parameters from a mobile apparatus to a server, the assistance data handling parameters being configured to be used at a server for determining whether to provide assistance data information associated with at least one assistance data based on a track of quality information of the at least one assistance data at the server, the track of quality information being associated with a current version and at least one previous version of the at least one assistance data, wherein said track of quality information comprises quality information associated with the current version of a respective assistance data and at least one quality information associated with at least one previous version of the respective assistance data.

8. The method according to claim 7, wherein the assistance data handling parameters is indicative of version information of the at least one assistance data.

9. The method according to claim 7, wherein the assistance data handling parameters are indicative that the assistance data information to be provided is at least one of:
    at least one assistance data; and
    quality information of at least one of the at least one assistance data; and
    at least one indicator associated with at least one assistance data, each of the at least one indicator indicating whether the respective assistance data in the mobile device is valid or not.

10. The method according to claim 9, the assistance data handling parameters being indicative for applying at least one trigger for triggering the determination at the server, wherein the at least one trigger is at least one of:
    a request of the mobile device;
    a predefined time interval; and
    when updated quality information is in the track of quality information; and
    when quality information associated with a new version of at least one assistance data is in the track of quality information.

11. The method according to claim 7, wherein said data handling information comprises a request configured to trigger the determination whether to provide assistance data information at the server.

12. A method, comprising:
    providing quality information of at least one assistance data to a server, the quality information being associated with a version of at least one assistance data and being configured to be used at the server for determining whether to provide assistance data information associated with at least one assistance data based on a track of the quality information of the at least one assistance data and assistance data handling parameters associated with a mobile device, the track of quality information being associated with a current version and at least one previous version of the at least one assistance data, wherein the track of quality information comprises quality information associated with the current version of a respective assistance data and at least one quality information associated with at least one previous version of the respective assistance data.

13. An apparatus comprising a processor and a memory including computer program code, the memory and the computer program code configured to, with the processor, cause the apparatus to:
    keep track of quality information of at least one assistance data on a server, the track of quality information being associated with a current version and at least one previous version of the at least one assistance data; wherein said track of quality information comprises quality information associated with the current version of a respective assistance data and at least one quality information associated with at least one previous version of the respective assistance data; and determine on the server whether to provide assistance data information associated with at least one assistance data to a mobile device based on tracked quality information of the at least one assistance data and based on assistance data handling parameters associated with the mobile device.

14. The apparatus according to claim 13, wherein the apparatus is one of:
a chip;
an integrated circuit; and
a server.

15. An apparatus comprising a processor and a memory including computer program code, the memory and the computer program code configured to, with the processor, cause the apparatus to:
provide assistance data handling parameters from a mobile apparatus to a server, the assistance data handling parameters being configured to be used at a server for determining whether to provide assistance data information associated with at least one assistance data based on a track of quality information of the at least one assistance data at the server, the track of quality information being associated with a current version and at least one previous version of the at least one assistance data, wherein said track of quality information comprises quality information associated with the current version of a respective assistance data and at least one quality information associated with at least one previous version of the respective assistance data.

16. The apparatus according to claim 15, wherein the apparatus is one of:
a chip;
an integrated circuit;
a mobile device.

17. An apparatus comprising a processor and a memory including computer program code, the memory and the computer program code configured to, with the processor, cause the apparatus to:
provide quality information of at least one assistance data to a server, the quality information being associated with a version of at least one assistance data and being configured to be used at the server for determining whether to provide assistance data information associated with at least one assistance data based on a track of the quality information of the at least one assistance data and assistance data handling parameters associated with a mobile device, the track of quality information being associated with a current version and at least one previous version of the at least one assistance data, wherein the track of quality information comprises quality information associated with the current version of a respective assistance data and at least one quality information associated with at least one previous version of the respective assistance data.

18. The apparatus according to claim 17, wherein the apparatus is one of:
a chip;
an integrated circuit;
a server associated with a data provide.

19. A non-transitory computer readable storage medium for storing computer program code causing an apparatus to perform when executed on a processor:
keeping a track of quality information of at least one assistance data on a server, the track of quality information being associated with a current version and at least one previous version of the at least one assistance data; wherein said track of quality information comprises quality information associated with the current version of a respective assistance data and at least one quality information associated with at least one previous version of the respective assistance data; and determining on the server whether to provide assistance data information associated with at least one assistance data to a mobile device based on tracked quality information of the at least one assistance data and based on assistance data handling parameters associated with the mobile device.

20. A non-transitory computer readable storage medium for storing computer program code causing an apparatus to perform the following when executed on a processor:
providing assistance data handling parameters from a mobile apparatus to a server, the assistance data handling parameters being configured to be used at a server for determining whether to provide assistance data information associated with at least one assistance data based on a track of quality information of the at least one assistance data at the server, the track of quality information being associated with a current version and at least one previous version of the at least one assistance data, wherein said track of quality information comprises quality information associated with the current version of a respective assistance data and at least one quality information associated with at least one previous version of the respective assistance data.

21. A non-transitory computer readable storage medium for storing computer program code causing an apparatus to perform the following when executed on a processor:
providing quality information of at least one assistance data to a server, the quality information being associated with a version of at least one assistance data and being configured to be used at the server for determining whether to provide assistance data information associated with at least one assistance data based on a track of the quality information of the at least one assistance data and assistance data handling parameters associated with a mobile device, the track of quality information being associated with a current version and at least one previous version of the at least one assistance data, wherein the track of quality information comprises quality information associated with the current version of a respective assistance data and at least one quality information associated with at least one previous version of the respective assistance data.

22. A system, comprising:
a first apparatus comprising a processor and a memory including computer program code, the memory and the computer program code configured to, with the processor, cause the first apparatus to:
keep track of quality information of at least one assistance data on a server, the track of quality information being associated with a current version and at least one previous version of the at least one assistance data; wherein said track of quality information comprises quality information associated with the current version of a respective assistance data and at least one quality information associated with at least one previous version of the respective assistance data; and determine on the server whether to provide assistance data information associated with at least one assistance data to a mobile device based on tracked quality information of the at least one assistance data and based on assistance data handling parameters associated with the mobile device;

a second apparatus comprising a processor and a memory including computer program code, the memory and the computer program code configured to, with the processor, cause the second apparatus to provide assistance data handling parameters from the mobile device to the server, the assistance data handling parameters being configured to be used at the server for determining whether to provide assistance data information associated with at least one assistance data based on a track of quality information of the at least one assistance data at the server, the track of quality information being associated with a current version and at least one previous version of the at least one assistance data, wherein said track of quality information comprises quality information associated with the current version of a respective assistance data and at least one quality information associated with at least one previous version of the respective assistance data; and a third apparatus comprising a processor and a memory including computer program code, the memory and the computer program code configured to, with the processor, cause the apparatus to provide quality information of at least one assistance data to the server, the quality information being associated with a version of at least one assistance data.

* * * * *